Feb. 23, 1971   C. K. NEULANDER ET AL   3,564,819
MEMBRANE PACKAGE CONSTRUCTION
Filed Feb. 24, 1970   4 Sheets-Sheet 3

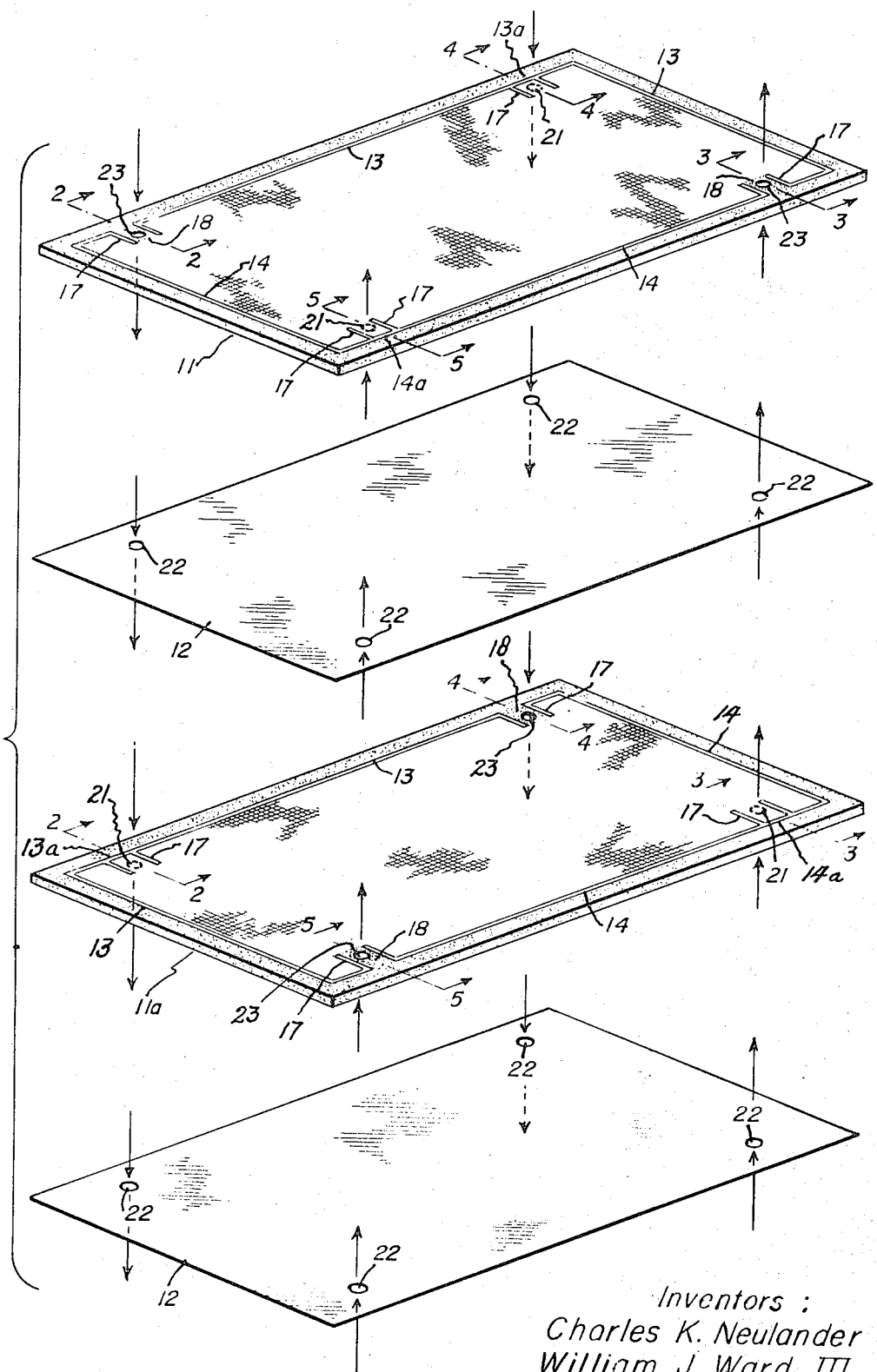

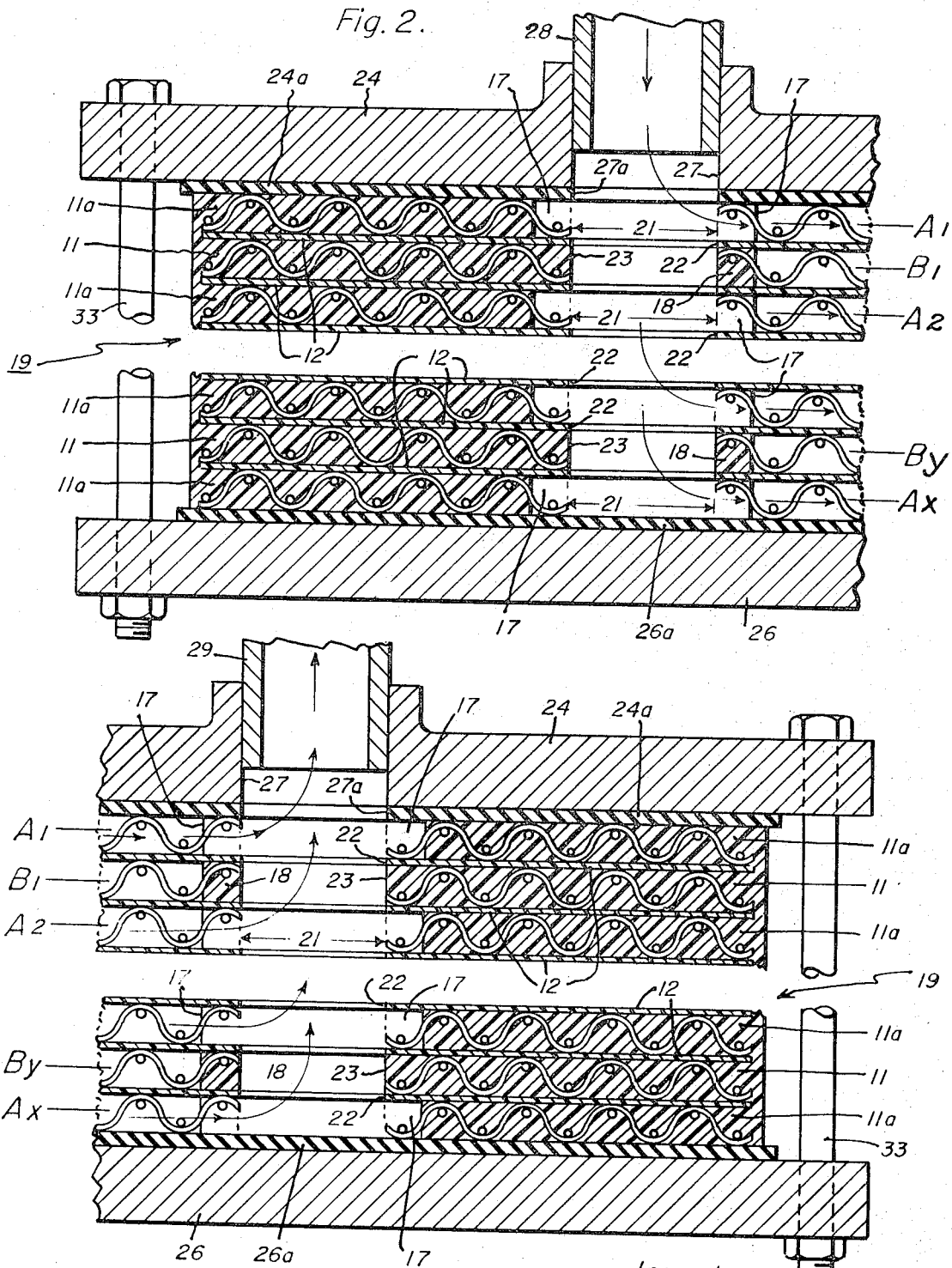

Inventors:
Charles K. Neulander;
William J. Ward, III,
by
Their Attorney.

Feb. 23, 1971    C. K. NEULANDER ET AL    3,564,819

MEMBRANE PACKAGE CONSTRUCTION

Filed Feb. 24, 1970    4 Sheets-Sheet 4

Inventors:
Charles K. Neulander;
William J. Ward, III,
by *Leo J. Marossi*
Their Attorney.

United States Patent Office 3,564,819
Patented Feb. 23, 1971

3,564,819
MEMBRANE PACKAGE CONSTRUCTION
Charles K. Neulander and William J. Ward III, Schenectady, N.Y., assignors to General Electric Company, a corporation of New York
Filed Feb. 24, 1970, Ser. No. 13,267
Int. Cl. B01d *13/00*
U.S. Cl. 55—158                                6 Claims

ABSTRACT OF THE DISCLOSURE

A packaged membrane device is described which consists of a plurality of spaced membranes disposed in substantially parallel surface-to-surface array so as to define both a first group of flow volumes and a second group of flow volumes alternating between the first group. Membrane-spacing means (e.g. a woven screen) is located in each of the flow volumes. The walls of the device extend transversely to the membranes and serve the dual purposes of defining the periphery of each of the flow volumes and of bonding together adjacent membranes and the spacing means located therebetween into an integrated structure. The distribution of separate flows of fluid to and from each group of flow volumes is facilitated by a plurality of discontinuous channels having gas-tight walls that extend transversely between adjacent membranes. Each channel places a pair of adjacent flow volumes of the same group in flow communication, while at the same time the gas-tight wall of each channel bonds together the portion of the spacing means embedded therein and the portions of the membranes located at each end of the wall.

BACKGROUND OF THE INVENTION

The invention herein described was made in the course of, or under, a contract with the United States Air Force.

U.S. Patents 3,354,618—Dounoucos and 3,416,985—Dounoucos are representative of "flat-sheet" gas transfer device construction known at the time of the instant invention and disclose methods for the preparation thereof including the use of plugs to secure the manifolding required.

For certain applications in which there is a limitation on packaging volume (e.g. the total thickness of the package must be kept below some minimum value) it becomes necessary to employ such fine screens as the separators between membranes that it is infeasible to employ plugs (either soluble or insoluble) as used in the above-noted patents to insure accessibility to the gas exchange passages after completion of the bonding together of the edges of the device to form a sealed composite. Further, considerable difficulty is encountered in the prior construction, when the attempt is made to provide multiple input channels to the same group of flow volumes even when larger screen sizes are used.

For these reasons, a membrane package construction and methods for its preparations are necessary to provide the capability for minimizing packaging volume and for employing multiple access and egress conduits to the same group of flow volumes.

SUMMARY OF THE INVENTION

The above-mentioned prior art construction discloses a membrane package in which (a) a plurality of spaced membranes are disposed in substantially parallel surface-to-surface array to define both a first group of flow volumes and a second group of flow volumes alternating between the first group, (b) a separating screen is located in each of the flow volumes, (c) means are provided for bonding together the edges of the layered assembly of membranes and separating screens into a sealed composite and (d) separate means are provided by which access to and egress from each of the groups of flow volumes are achieved, entry to the flow volumes being made through the bonded edges of the device.

The instant invention provides a significant improvement over the above-described construction by accomplishing access and egress into the flow volumes in a direction transverse to the direction in which the flow channels extend by utilizing a plurality of discontinuous channels having gas-tight walls extending between adjacent membranes. Each channel places into flow communication a pair of adjacent flow volumes of the same group while the gas-tight wall defining each channel bonds together the portion of the spacing means (e.g. separating screen) embedded therein and portions of the membranes located at each end of the wall.

BRIEF DESCRIPTION OF THE DRAWINGS

The exact nature of this invention as well as objects and advantages thereof will be readily apparent from consideration of the following specification relating to the annexed drawing in which:

FIG. 1 is an exploded view of the spacing means and interposed membrane construction showing the spacing means as it would apppear in the completed structure (the end plates and gaskets are not shown);

FIG. 2 is an enlarged sectional view taken on line 2—2 of FIG. 7 (the relationship of this section to each disposition of the spacing means encountered in the device is also shown in FIG. 1);

FIGS. 3, 4, and 5 are similar to FIG. 2 being taken on lines 3—3, 4—4, and 5—5, respectively;

DESCRIPTION OF THE PREFERRED EMBODIMENT

Figures 4, 5:
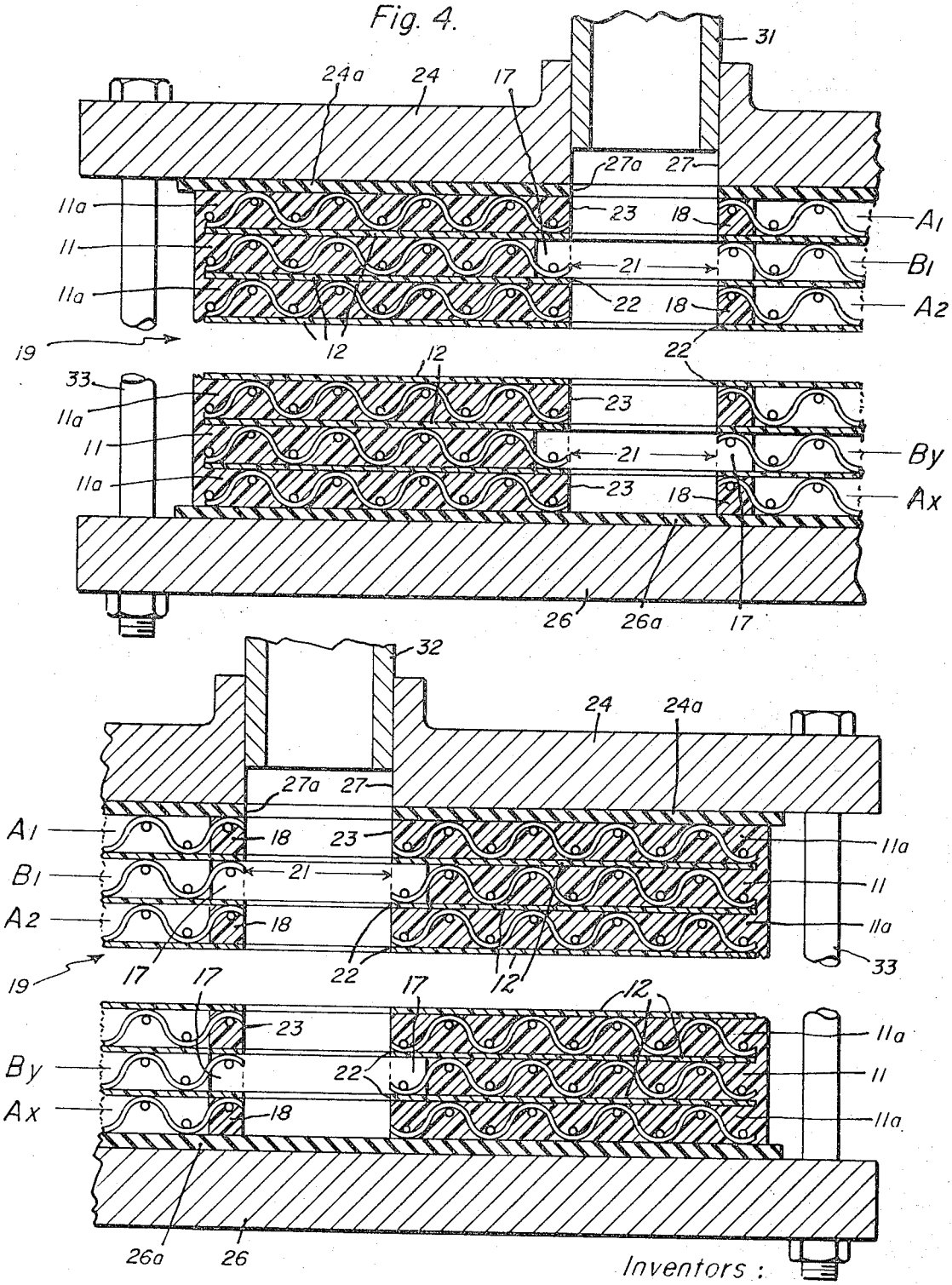

Although the improved construction of the instant invention may be applied to gas separation devices, gas concentrator devices, blood oxygenators, dialysis units, heat exchangers, etc., the utilization thereof for the preparation of gas separation devices will be described by way of example.

A repetitive stack arrangement comprising separator screen 11, membrane 12, separator screen 11a and the next membrane 12 is shown in FIG. 1. Separator screens 11 and 11a are identically made, but are disposed in reverse fashion in the stack, and membranes 12 are merely used in repetition (between each pair of separator screens 11, 11a).

Preferably, separator screens 11, 11a are woven screens e.g. polyester or nylon monofilament screen cloth having mesh openings in the range of about 400 microns to about 1200 microns and an open area ranging from about 45 to 55 percent. Other sizes of mesh openings and percentages of open area may be used depending upon the strength of the membranes employed, the pressure difference prevailing across the membrane and the criteria to be set for fluid flow through the screens. Screens prepared from other materials may be employed so long as the material is capable of retaining its structural integrity under the operating conditions and is compatible with the fluids employed.

In a gas separation device imperforate membranes that permit certain specific gases or vapors to pass therethrough to the substantial exclusion of others would be employed. The preparation of such membranes is disclosed in U.S. Patent 3,396,510—Ward et al.; U.S. Patent 3,335,545—Robb et al. and U.S. Patent 3,325,330—Robb, for example. In addition, excellent capability for resisting pressure differential has been obtained with immobilized liquid membranes in which the liquid is lodged in the pores of a microporous layer made of a material wet by the liquid used. By way of example, an immobilized liquid membrane was prepared by impregnating a 5 mil thick sheet of the filter material sold under the trademark "Solvinert" (0.25 micron nominal pore size) with a saturated cesium bicarbonate aqueous solution. Tests have shown that the bubble point (the pressure needed to dislodge the liquid from the pores) for this material is at least 30 p.s.i., if the Solvinert is soaked in cesium bicarbonate solution containing a small concentration of wetting agent soluble in the system, e.g. 1% by weight of low molecular weight (400–1000) polyethylene glycol. This material (Solvinert) appears under infrared analysis to be a terpolymer of polyvinyl alcohol, polyvinyl chloride and polyvinyl acetate.

Other membrane materials useful as immobilizing mediums for various liquids wet thereby include the ultrafine porous polymer membrane disclosed in U.S. patent application Ser. No. 717,893—Weininger et al. (filed Apr. 1, 1968 and now abandoned and assigned to the assignee of the instant invention) and the materials described in U.S. Patents 3,378,057—Sargent et al.; 2,984,869—Honey et al.; 3,351,489—Larson et al., 3,216,882—Feldt et al., and 3,062,760—Dermody et al. The disclosures of the aforementioned patent application and patents are incorporated herein by reference in their entirety.

Before interleaving the membranes 12 between separator screens 11, 11a the separator screens must be prepared so that after the assembly and potting steps (which follow) have been executed and the potting medium has hardened, the manifolding system may be developed simply by drilling holes through the package.

The preparation referred to is the impregnating of each separator screen with peripheral bead segments 13 and 14 and inwardly-directed bead extensions 17 as shown. The beads should be of uniform height relative to the plane of the screen. Preferably, the material of which the beads are composed will be a chemically inert self-setting liquid, which sets or cures as an elastomeric material. As may be seen from the drawing, the bead extension 17 partially define small spaced areas, which fall into two categories, (a) those which are additionally defined by bead segments 13, 14 (note bead portions 13a, 14a) and (b) those between which bead material is missing. Separator screen 11 differs from separator screen 11a only in its orientation in the assembly as may be seen in FIG. 1. Because of this difference in orientation and repetition of the two orientations, each of the two different categories of defined small spaced areas will be aligned with similar areas of the same category, when screen separartors and membranes are assembled. The purpose for the presence or absence of bead portions 13a, 14a is explained hereinbelow.

When the desired number of bead-impregnated separator screen have been prepared, the membranes and separating screens are stacked so that each pair of membranes 12 has a separator screen therebetween. However, the disposition of the screen separators above and below any given membrane differs in that bead portions 13a, 14a in the screen separator immediately thereabove will overlie locations in the separator screen immediately therebelow from which bead portions are missing. Bead portions 13a of alternate separator screens will be in vertical alignment and similarly bead portions 14a of alternate separator screens will be in vertical alignment.

When the package of membranes and separating screens has been made the assembly is clamped. Thereafter, each edge of the assembly is immersed to a predetermined depth in a potting compound. The liquid potting compound enters the package through the exposed edges of the separator screens until it encounters beads 13 and 14, which prevents its further penetration, except for each defined area between bead extremities 17, where a gap exists between beads 13 and 14. In these areas and along the edge regions the potting compound is free to enter to the extent shown (stippled area). The potting liquid is specifically selected to have the following properties:

(a) it must wet the membrane surface,
(b) it must form an adhesive bond with the membrane material,
(c) it must be a viscous liquid containing little or no diluent,
(d) it must be chemically inert to the material with which it must come into contact,
(e) it must be self-setting and
(f) it must set as a non-porous barrier (capable of preventing the flow of gas therethrough in those constructions in which gas separations are to be effected).

An example of a suitable potting compound for use with Solvinert membranes in which a liquid membrane has been immobilized is a bisphenol-A based epoxy resin. to which has been added a catalyst system consisting of a modified polyamine plus polyamide. Another useful potting material is polyester adhesive.

The bead material is preferably an elastomer such as room temperature vulcanizing silicone rubber, although other materials such as wax or putty may be satisfactorily employed for this damming function. In the case of a potting liquid curing as an elastomer it is preferred to apply the bead material to the screen and then place the screen between plate surfaces (e.g. plexiglass) with spacing means such that the bead when cured (plates removed) is slightly thicker than the screen it impregnates and is of uniform height from the plane of the screen. Thus when in the assembly (FIGS. 2–5) the beads are under compression and are in sealing engagement with adjacent membranes during the potting.

After completion of the potting operation and subsequent curing, the edges of each membrane and separator screen in the assembly are bonded into unified walls such as is shown in FIGS. 2–5. Wherever portions of the damming beads 13, 14 are lacking, the potting liquid proceeds further inward to develop projections 18 in vertical alignment over each other (in alternate layers).

When the potting material has hardened, holes are drilled through the package transverse to the direction of the planes of the laminae. Each of these holes passes through each screen and through each extension 18 encountered to form a vertical manifolding arrangement. Thus, in the assembled membrane package 19 the same sequence of holes exists along a section taken on line 2—2 (FIG. 2) as occurs along a section taken on line 3—3 (FIG. 3). Similarly, the same sequence of holes exists along a section taken on line 4—4 (FIG. 4) as occurs along a section taken on line 5—5 (FIG. 5). By way of illustration, in FIGS. 2 and 3 hole 21 is the hole through the uppermost separator screen and this hole passes through screen material only. Hole 22 is the hole through the uppermost membrane 12. Hole 23 is the hole immediately thereunder and this hole passes through both the potting material of extension 18 and the screen embedded therein. The same sequence then repeats itself. In the sections shown in FIGS. 4 and 5, the sequence of holes begins with a hole 23 through the uppermost screen, passing through both the potting material of extension 18 and the screen embedded therein.

Figure 7:
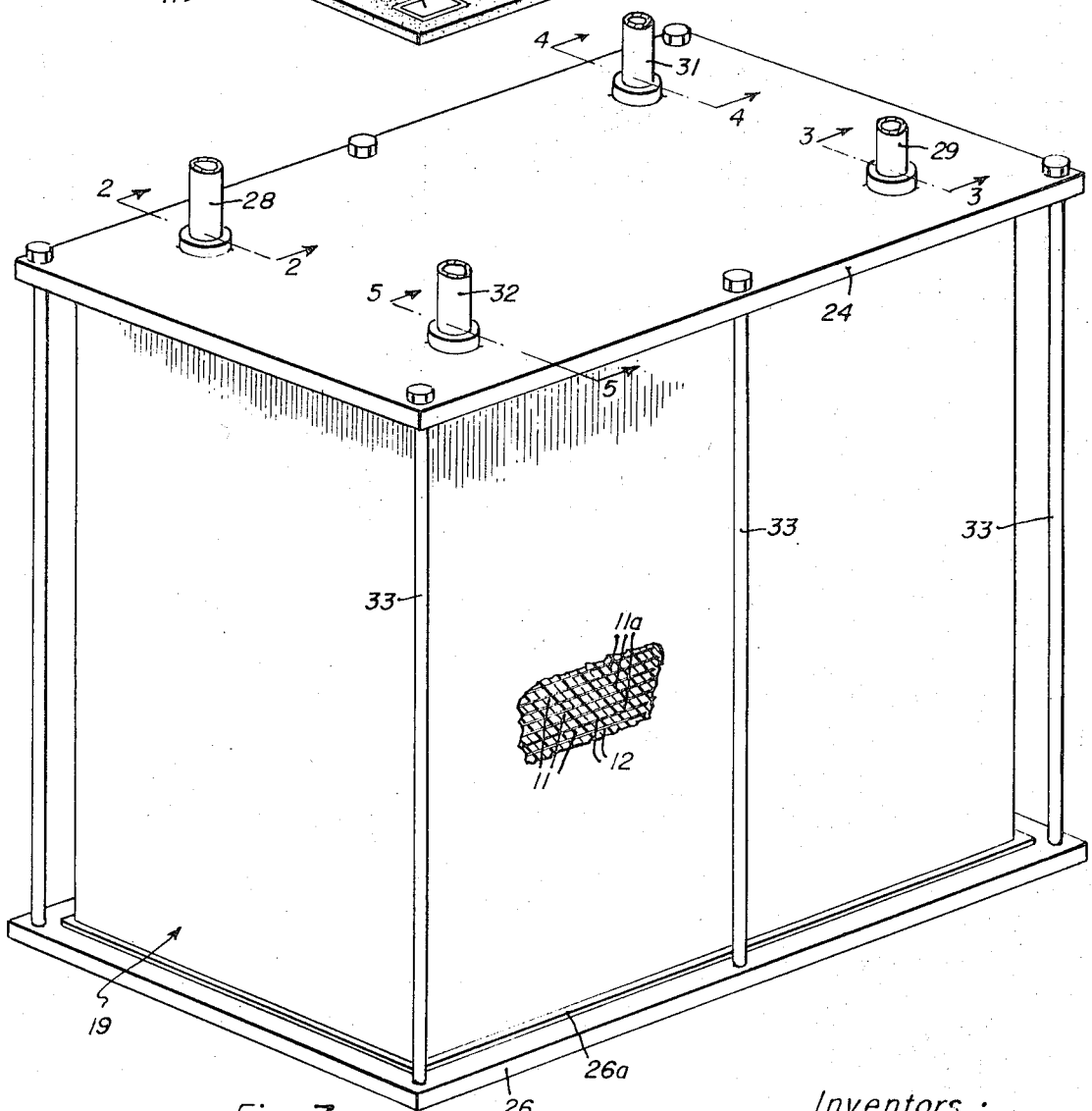

The membrane package 19 is then sandwiched between metal end plates 24, 26 and gaskets 24a, 26a having holes 27 and 27a, respectively, matching with the vertical sequence of manifolding holes in the membrane package 19. End plates 24, 26 serve both to force the gaskets into sealing engagement with the membrane package 19 and to provide terminals for conduits 28, 29, 31, 32 as shown in FIG. 7. Fasteners 33 arranged around the perimeter of the device as shown in FIG. 7 provide biasing force for the end plates.

Optionally, the first and last laminae of the membrane package 19 may be of solid sheet, e.g. sheet metal to provide stiffness and protection for the package. When employed, such stiffener sheets become an integral part of the package after the potting operation. End plates and gaskets are then employed as described hereinabove.

In operation a flow of feed gas entering through conduit 31 will exit via holes 21 to pass through the alternate flow volumes $B_1, B_2 \ldots B_y$ comprising flow volume group B. This feed gas stream sweeps over the surfaces of membrane 12 forming the boundaries thereof on its way to exit to conduit 32 via holes 21 at that vertical manifold as is shown in FIG. 5. Simultaneously, the sweep gas stream enters conduit 28 and is manifolded via holes 21 into flow channels $A_1, A_2 \ldots A_x$ comprising flow volume group A. The sweep gas stream exits via holes 21 from flow volume group A to leave the device via conduit 29 as is shown in FIG. 3.

Other arrangements may, of course, be employed. In addition to simplifying the entire assembly operation this improved manifolding technique greatly simplifies the provision of multiple access manifolds and/or multiple egress manifolds. Such a construction facility enables more effective use of the available manifold area, whatever its function by the freedom provided for selection of flow configurations.

At each channels (hole 23) provided through an extension 18, the fluid flow traversing the channel is prevented from entering the flow channel abutting the extension by the presence of the potting material comprising extension 18 and forming the confining walls of each hole 23. In addition these confining walls serve to bond together the screen separator embedded therein and each membrane 12 located at a face of extension 18.

The preferred arrangement of bead embedment in the screen separator has been described above. A modified arrangement of bead embedment for the screen separators is shown in FIG. 6 in which each screen separator 41 is provided with bead embedment in the shape of a plurality of closed planar figures in combination with a plurality of planar figures having an opening in the perimeter thereof, each opening facing away from the edge of the screen.

Figure 6:
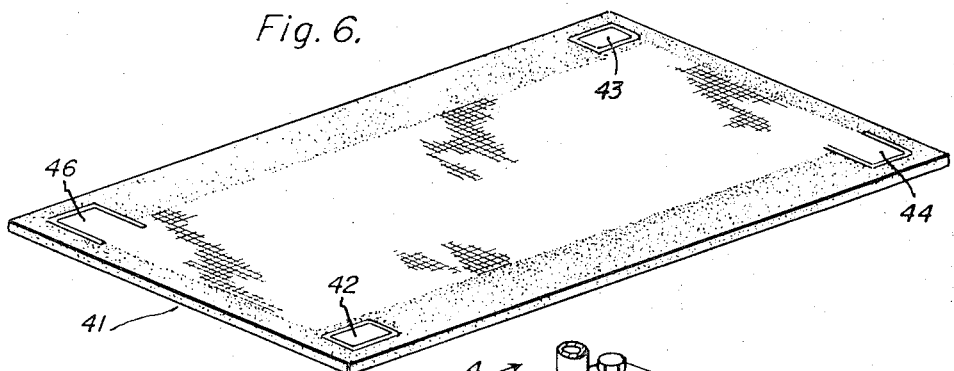
FIG. 6 is a view of a modified construction of spacing means in accordance with this invention and FIG. 7 is a three-dimensional view of a membrane package in which the instant invention may be employed.

Thus, in FIG. 6 (after assembly and potting) the potting compound will have been excluded from boxes 42, 43, but will completely enclose these boxes. The potting compound will have been unable to enter open sided boxes 44 and 46 as well, but the open side of each of these figures assures flow communication with the embedded screen 41 as in the description provided above. The membranes employed in combination therewith are disposed in alternating arrangement with screens 41 and alternate screens 41 are turned over so that closed boxes 42, 43 will have open boxes 44, 46, respectively, located immediately thereabove and therebelow (except, of course, at the outer extremities of the membrane package). Holes are drilled through the package as in the case of the preferred embodiment in order to develop the manifold system. End plates and gaskets are applied thereto to provide a package such as is shown in FIG. 7.

In the practice of this invention, the technician should first select the appropriate membrane material for the exchange mechanism to be conducted and determine the area of membrane required and the residence time/flow volume requirements based upon some given pattern of exchange (counter current flow, cross flow, etc.). In may instances, the technician is faced with a dimensional problem and/or a weight problem for the package and these criteria will determine the selection of membrane thicknesses, screen separator thicknesses, mesh sizes, etc. Once the selection of materials for these components has been made, the selection of material for the bead impregnation and the potting material may be easily selected in accordance with the guidelines and examples provided hereinabove.

EXAMPLE

In an exemplary construction Solvinert microporous membrane material having a thickness of about 5 mils and a nominal pore size of 0.25 micron was used to immobilize a saturated cesium bicarbonate solution (about 6.4 N, pH about 10). The screen separators used were polyester monofilament screen cloth about 25 mils thick having mesh openings measuring about 800 microns (about 23.5 meshes per inch) and a 55% open area.

Each screen was impregnated with beads of room temperature vulcanizing silicone rubber as illustrated in FIG. 1 and then clamped between a pair of plexiglass plates to provide a total screen thickness (face to face of beads) of about 32 mils. The bead material was permitted to self-cure.

In assembly the membranes were placed between screens in the manner illustrated in FIG. 1 to produce an assembly containing 20 membranes (about 15 ft.$^2$ of active membrane area). The assembly was clamped between temporary holding plates during the potting operation in which each side of the assembly was sealed by immersion in a bisphenol-A based epoxy resin system. The depth of dipping was sufficient to permit the desired inwardly extending dimension of extension 18.

After the epoxy had hardened, holes were drilled through the package so as to pass through aligned extension 18. The completed membrane package was then sandwiched between metal end plates, which had been fitted with requisite connections and was then ready for use. In test, it was determined that the device could withstand internal (all flow chambers) gas pressures of 100 p.s.i. without breakthrough.

In summation, the invention described herein provides a simple, reliable and practical method for the preparation of high packaging density packaged membrane systems having a unique manifolding configuration, which insures leak-proof performance at substantial internal pressures.

What we claim as new and desire to secure by Letters Patent of the United States is:

1. In a packaged membrane system in which (a) a plurality of spaced membranes are disposed in substantially parallel surface-to-surface array to define both a first group of flow volumes and a second group of flow volumes alternating between said first group, (b) spacing means for the membranes is located in each of said flow volumes, (c) means are provided for simultaneously defining the periphery of each of said flow volumes and bonding together adjacent membranes and the spacing means located therebetween to form gas-tight peripheral walls and (d) means are provided for separate access to and egress from the plurality of flow volumes in said first group of flow volumes and in said second group of flow volumes, the improvement in which the access and egress means comprise a plurality of discontinuous channels having gas-tight walls extending transversely between adjacent membranes, each channel placing a pair of adjacent flow volumes of the same group in flow communication and the gas-tight wall of each channel bonding together the portion of the spacing means embedded therein and the portions of the membranes located at the extremities thereof.

2. The improvement recited in claim 1 in which the discontinuous channels are arranged in a plularity of sets with the channels in each set being in alignment.

3. The improvement recited in claim 1 wherein the gas-tight walls of the plurality of discontinuous channels is formed integral with the gas-tight peripheral walls of the membrane package.

4. A method for the preparation of a packaged membrane system in which a plurality of sheet-like membranes and sheet-like screen separators are disposed in alternating sequence in a stack comprising the steps of:

(a) impregnating each screen with a pattern of damming means such that subsequent instrusion into said screen of a potting compound can be limited to a specifically defined continuous area extending around the perimeter of said screen, which are includes a plurality of inwardly-directed extensions, (b) placing the sheet-like screens so modified and the membranes in overlying stacked arrangement with a membrane located between each pair of said screens, (c) arranging said screens so that the inwardly-directed extensions of any given screen are not in juxtaposition with the inwardly-directed extensions of any screen adjacent thereto and yet with said inwardly-directed extensions of any given screen disposed in alignment with the inwardly-directed extensions of alternate screens in the stack, (d) immersing each edge of the assembly of membranes and screens in turn in a self-sealing potting liquid to a depth to permit penetration of the potting liquid into said inwardly-directed extensions of said screens, the penetrating potting liquid forming an adhesive bond with the surfaces of said membranes and said screens with which it comes into contact, (e) permitting said penetrating potting liquid to harden and (f) drilling holes through the resulting integrated package transverse to the major membrane/screen areas, the holes passing through said inwardly-directed extensions filled with dried potting material.

5. The method recited in claim 4 wherein silicone rubber is employed as the damming material.

6. The method recited in claim 4 wherein the potting liquid is an epoxy resin.

References Cited
UNITED STATES PATENTS

| | | | |
|---|---|---|---|
| 2,758,083 | 8/1956 | Van Hoek et al. | 210—321X |
| 3,129,146 | 4/1964 | Hassler | 210—321X |
| 3,256,174 | 6/1966 | Chen et al. | 210—321X |
| 3,354,618 | 11/1967 | Dounoucos | 55—158 |
| 3,416,985 | 12/1968 | Dounoucos | 55—158X |

SAMIH N. ZAHARNA, Primary Examiner

R. W. BURKS, Assistant Examiner

U.S. Cl. X.R.

210—321